United States Patent [19]
Rothwell, Jr.

[11] 3,717,000
[45] Feb. 20, 1973

[54] JIG FOR PERFORMING WORK IN A WEIGHTLESS MEDIUM

[75] Inventor: Guy N. Rothwell, Jr., Kaneohe, Hawaii

[73] Assignee: Telecheck International, Inc., Honolulu, Hawaii

[22] Filed: April 26, 1971

[21] Appl. No.: 137,521

Related U.S. Application Data

[62] Division of Ser. No. 808,158, March 18, 1969, Pat. No. 3,636,615.

[52] U.S. Cl. ............... 61/69 R, 29/213, 137/315, 269/58
[51] Int. Cl. .................... B22d 19/10, B23p 7/00
[58] Field of Search ......... 61/69, 63, 72.3; 166/.5, .6; 29/157.1, 213, 401; 137/315, 316, 329.1, 454.2; 269/58

[56] References Cited

UNITED STATES PATENTS

| 3,177,572 | 4/1965 | Mills | 29/401 |
| 3,508,410 | 4/1970 | Lynch | 61/69 R |
| 3,578,233 | 5/1971 | Meister | 269/58 X |
| 3,633,598 | 1/1972 | Morris | 137/315 X |

*Primary Examiner*—J. Karl Bell
*Attorney*—Charles B. Smith

[57] ABSTRACT

A jig for positioning a work performing member relative to an installation in a medium in which said member is essentially weightless and on which installation said work performing member is to perform work, for example, changing a component, such as a valve, in an under water pipeline in which the jig has clamping means for engagement with the installation structure and for moving the jig and vehicle attached thereto longitudinally along the structure for aligning the jig and vehicle with the component in the installation upon which work is to be performed, an arm and clamp for holding the replacement component and for positioning such replacement component in the installation, and an arm and clamp for engaging and removing the component to be replaced and a remote controlled unit associated with said jig for disconnecting the component to the under water installation and the method for operating such jig.

12 Claims, 16 Drawing Figures

JIG FOR PERFORMING WORK IN A WEIGHTLESS MEDIUM

The present application is a division of application Ser. No. 808,158 filed Mar. 18, 1969 now U.S. Pat. No. 3,636,615. The present invention relates to a jig for positioning a work performing member relative to an installation in a medium in which said member is essentially weightless and, more particularly, to a jig for replacing fixtures, such as valves, valve actuators and similar components, in underwater pipelines and installations.

Off-shore explorations for oil have resulted in the drilling of wells and the installation of well equipment, pipelines, valve, and the like, under water. Some of these wells, installations, pipelines, valves and associated equipment, are located at water depths of 300 ft. or more and wells at deeper depths are contemplated. Depending upon the depth of the installation below the surface, servicing of the well and its associated equipment present a formidable problem. For example, where the well installation is at a depth of about 250 ft. and servicing, for example, the replacement of valve in a pipeline is required, it has heretofore been necessary to send divers down to disconnect and remove the defective valve and install and connect a new valve. At such depths, a diver can only work a limited time and, because of the water pressures, water resistance and other conditions, the work that a diver can perform in such time is much less than could be performed in the same time on a barge at the surface. Hence, in order to change a valve, at such depths, a number of divers must be employed and the expense of changing a valve is substantial. At depths below about 300 ft., water pressures are so great that installations at such depths cannot be serviced with divers using conventional diving equipment. Thus, the exploitation of deposits at depths below 300 ft. has been substantially hindered.

The instant invention is concerned with the servicing and replacement of components, such as valves in installations located in a medium in which such replacement component is essentially weightless, for example, in an under water installation. This is accomplished, in the described embodiment, by a jig attached to the front of a submersible vehicle, for example, a one, two or three man submarine and, in the embodiment described, is adapted for the changing of a valve. As will be apparent from the following description, the jig may be adapted for other under water uses.

In the described embodiment, a new valve, for the valve to be replaced, is clamped onto an arm on the jig and is aligned with the jig while the jig is on the surface. This may be accomplished on dry land or at the surface, before the jig is attached to the submarine or, with the jig attached to the submarine, before the submarine, with the jig, submerges.

With the new valve clamped in the jib and aligned, the submarine submerges and is self-propelled and steered, by the submarine operator, to the pipeline where the valve is to be changed. On reaching the location where the valve is to be changed, the submarine is manipulated to bring clamping means on the jig into engagement with the pipeline. The clamps are closed, locking the jig and submarine to the pipeline. The jig and submarine are then aligned with the old valve by manipulation of the clamps. The old valve is disconnected and clamped to the jig. The old valve is released from the pipeline, swung out of the way on the jig and the new valve is swung into position. The new valve is connected to the pipeline and the clamps on the jig, clamping the jig and submarine to the pipeline, are released. The submarine can then return to the surface.

The entire manipulation, servicing and replacement operations are controlled by the operator, or operators, in the submarine. Thus, no divers are required and installations at depths below 300 ft. can be serviced. The servicing operation, conducted from inside of the submarine, is not affected by water pressures, water resistance and other conditions and servicing and replacement of components can be effected more rapidly and much less expensively. At shallower depths where divers can work for longer periods of time and more efficiently, the jig of the instant invention may be adapted for use by a diver, without the submarine. When so used, however, the jig, with the diver, would be lowered from a barge or surface vessel and brought into position with the pipeline. The jig would then be clamped to the pipeline by the diver who would align the jig with the old valve by manipulation of the clamps.

The invention will be more fully understood from the following description and appended drawings of an embodiment of the invention for changing valves in under water pipelines in which.

Figures 1A, 1B:
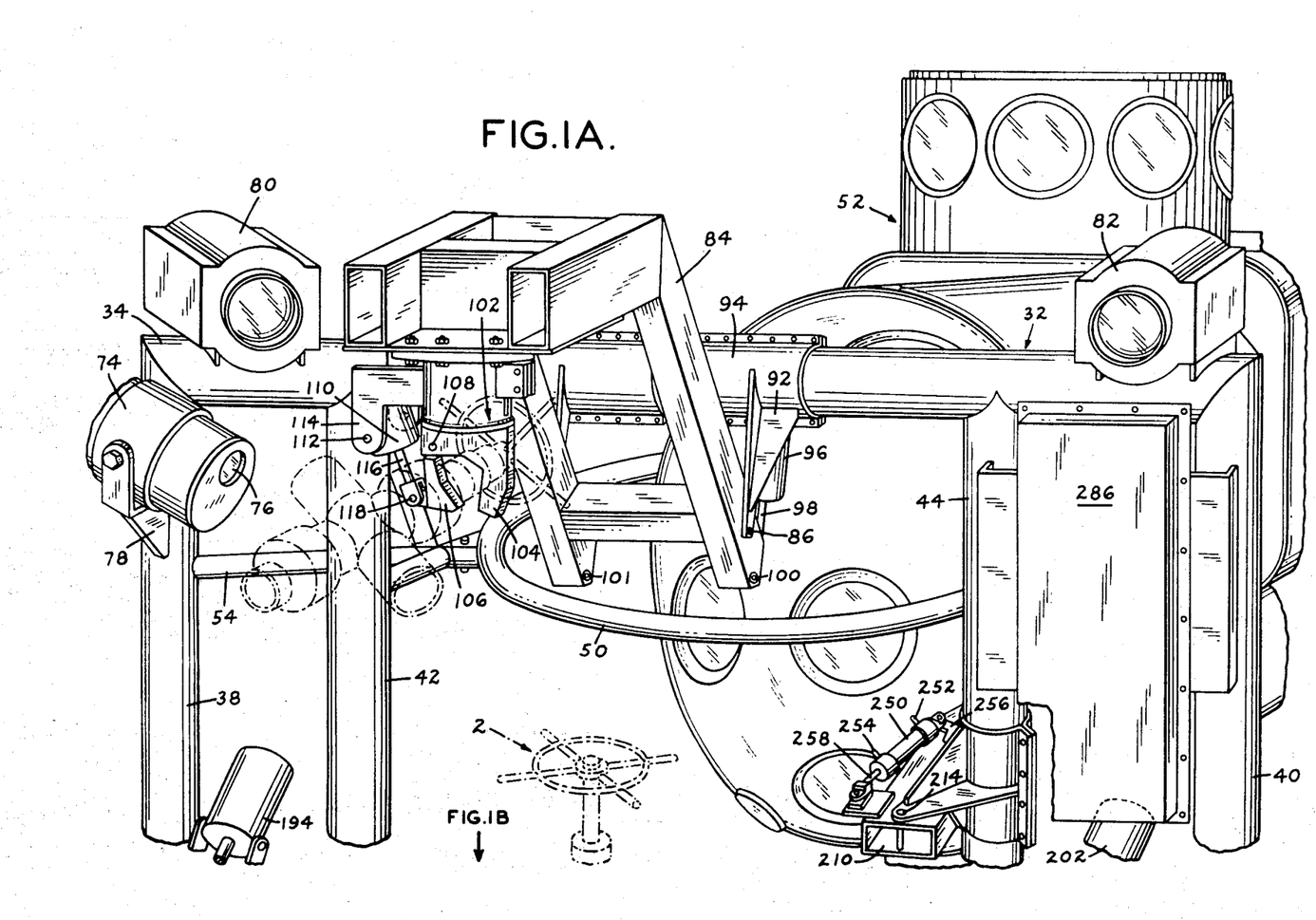
FIGS. 1A and 1B are a perspective view, taken from the front of the apparatus of the instant invention, in which the instant apparatus is shown in full line and the pipeline and valve being replaced are shown in phantom line, the upper half of the apparatus being shown in FIG. 1A and the lower half in FIG. 1B.
Figure 1B:
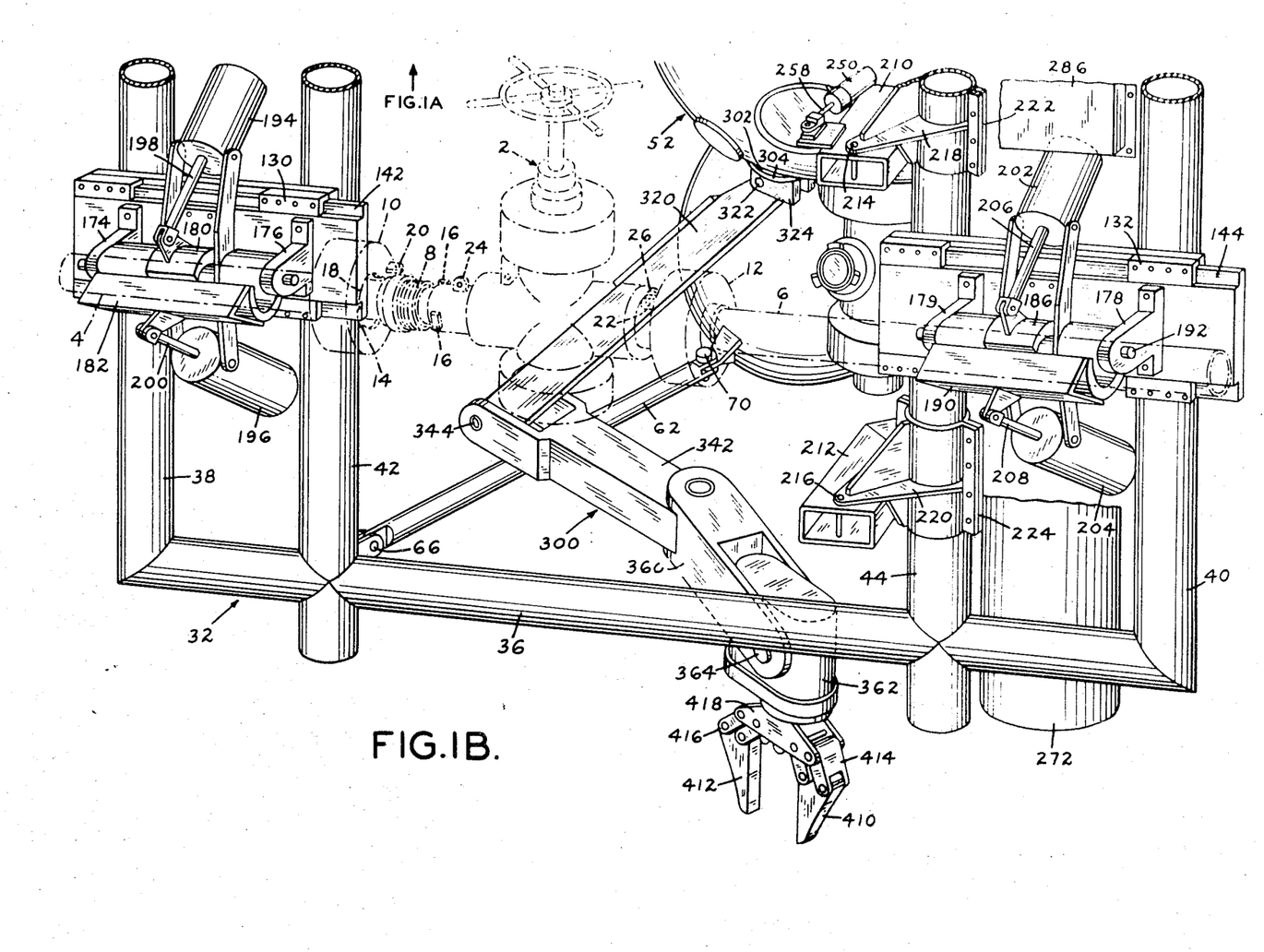
Figure 2:
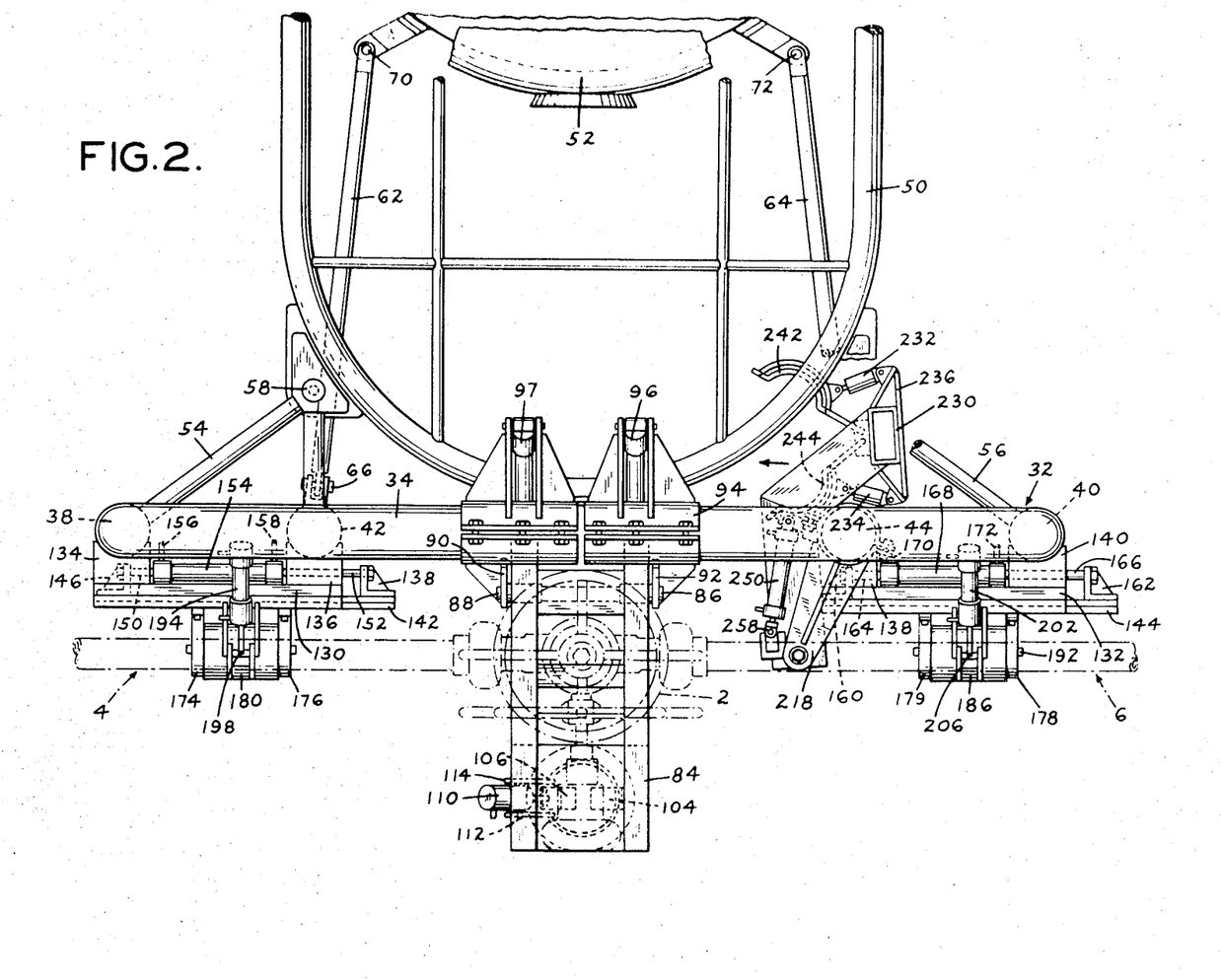
FIG. 2 is a top elevational view of the apparatus of FIGS. 1A, 1B, with certain of the components omitted and other components broken away for purposes of illustration.
Figure 3:
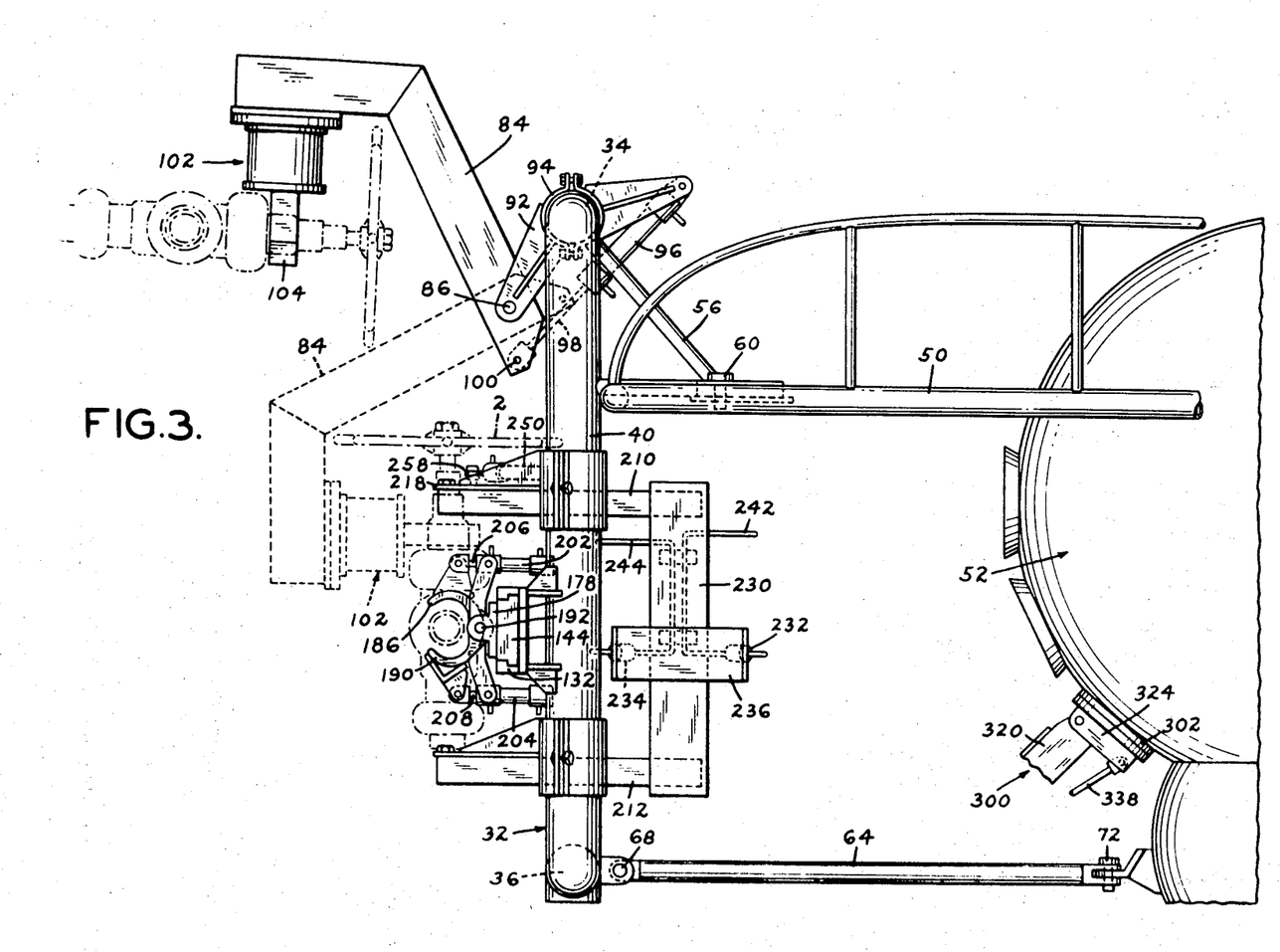
FIG. 3 is a side elevational view of the apparatus of FIG. 2.
Figure 4:
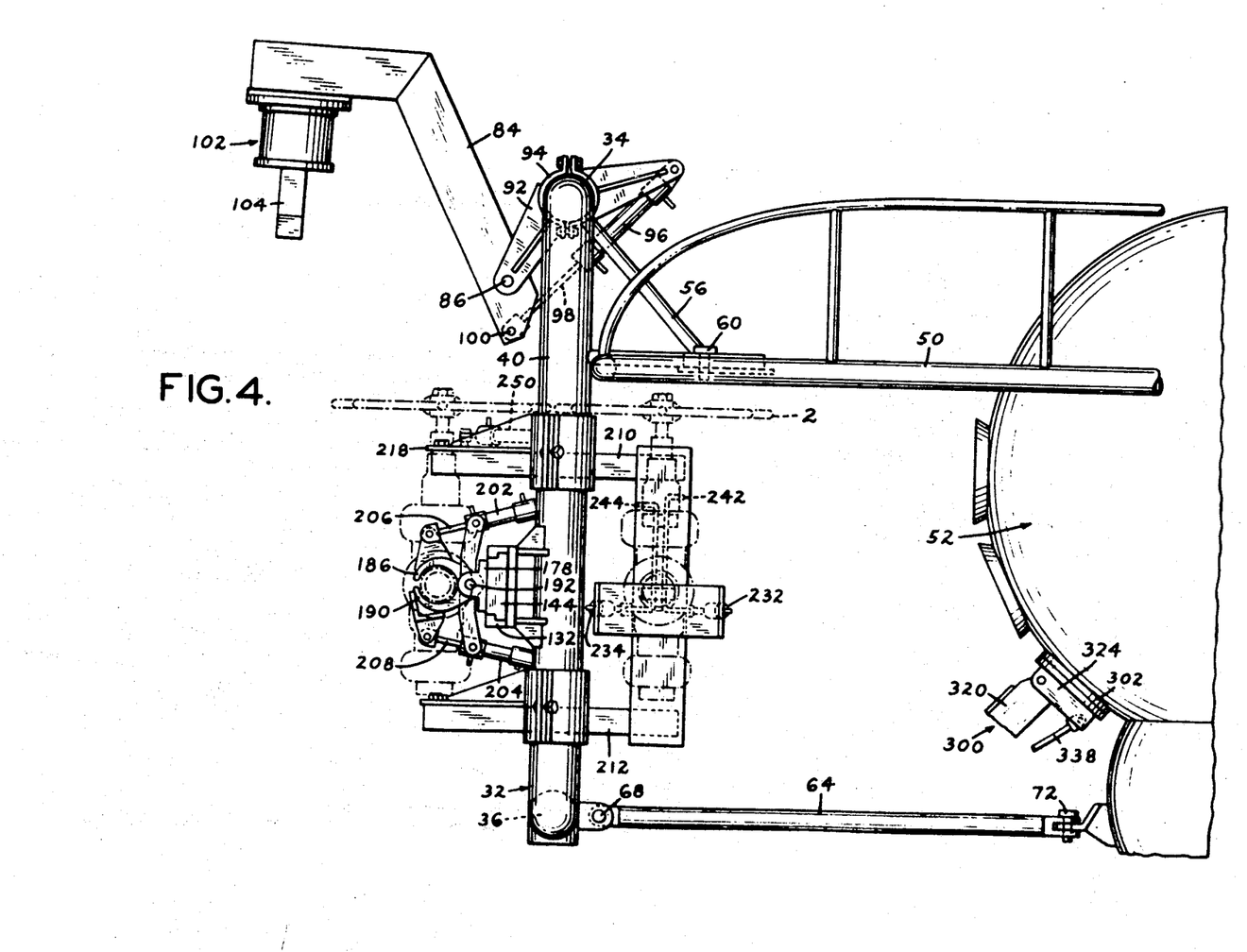
FIG. 4 is a side elevational view similar to FIG. 3 but showing various of the components in different operating positions.

Referring to the drawings, and particularly FIGS. 1A, 1B and 2, the apparatus of the instant invention is adapted for changing valve 2 coupled between pipe sections 4, 6, of a pipeline. The ends of pipes 4, 6, at valve 2, each having a packing 8 and couplers 10, 12 having recesses 14 for receiving lugs 16 on valve 2. Lands 18, intermediate recesses 14, which, after recesses 14 on coupler 10, 12 have been passed over lugs 16, and the couplers 10, 12 are rotated, lock valve 2 to pipes 4, 6. Packings 8, with valve 2 and pipes 4, 6, locked, form a liquid tight connection between the valve and the pipes. When couplers 10, 12 are rotated and locked on valve 2, locking lugs 20, 22, on couplers 10, 12, respectively, are brought into contact with locking lugs 24, 26 on valve 2 and a bolt for locking the coupling and the valve is inserted through each pair of contacting locking lugs. This is a standard valve arrangement commonly employed on pipe lines and is illustrative of one type of valve for which the apparatus of the instant invention may be adapted. As will be obvious to those skilled in the art from the following description, the apparatus may be adapted for other types of valves and other under water accessories.

As best shown in FIGS. 1A, 1B and 2, the apparatus of the instant invention includes a frame, generally designated 32, having an upper horizontal member 34, a lower horizontal member 36, outer vertical members 38, 40 and inner vertical members 42, 44. Members 34, 36, 38, 40, 42 and 44 are, preferably, tubes fitted and welded to form a rigid frame structure. Frame 32 is connected to ring 50 mounted on submarine 52 by pins, not shown, by brackets 54, 56, welded at one end to frame 32 and connected at their opposite ends by pins 58, 60 to ring 50. The lower end of frame 32 is connected to the submarine by struts 62, 64 connected at one end by pin 66, 68 to frame 32 and, at their opposite ends, by pins 70, 72 to submarine 52. Referring to FIG. 1A, television camera 74 having a lens 76 is mounted by bracket 78 on frame 32 with the lens 76 of the camera directed toward the location of valve 2. Lights 80, 82 are mounted on frame 32 for purposes of illumination.

New valve holding arm 84 is pivotally mounted at 86, 88 to brackets 90, 92 of collars 94 clamped and locked in fixed position on upper horizontal member 34 of frame 32. Cylinders 96, 97, are pivotally connected to collar 94 and piston rods 98, 99 of cylinders 96, 97, respectively, are pivotally connected at 100, 101 to arm 84. For reasons more apparent hereinafter cylinders 96, 97, and piston rod 98, 99 raise and lower new valve holding arm 84. Clamp 102, having a fixed element 104 and a movable element 106, pivoted at 108, is attached at the free end of arm 84. Cylinder 110 is pivotally mounted at 112 to bracket 114 and piston rod 116 of cylinder 110 is pivotally connected at 118 to movable element 106.

Fixed clamp plates 130, 132 are mounted in fixed position on vertical members 38, 42 and 40, 44, respectively, by brackets 134, 136, 138, 140, fastened at one end, such as by welding, to vertical members 38, 42, 40, 44, respectively, and at their other end to plates 130, 132. Movable clamp plates 142, 144 are slidable, horizontally, in fixed plates 130, 132, respectively. Brackets 146, 148 fixed to plate 142 are fastened to the ends of piston rods 150, 152 of cylinder 154 mounted in fixed position on fixed plate 130. Cylinder 154 has, at its opposite ends, hydraulic lines 156, 158 through which, as later described, hydraulic fluid is introduced into cylinder 154 to slide movable plate 142 relative to fixed plate 130. In similar manner, brackets 160, 162 are fastened to movable plate 144 and are fixed to the ends of piston rods 164, 166 of cylinder 168 mounted in fixed position on fixed plate 132. Cylinder 168 has hydraulic lines 170, 172.

Brackets 174, 176 are fixed to movable plate 142 and brackets 178, 180 are fixed to movable plate 144. Clamping shoes 180, 182 are pivotally connected at 184 to brackets 174, 176 and clamping shoes 186, 190 are pivotally connected at 192 to brackets 178, 180. Cylinders 194, 196 are pivotally mounted on brackets 174, 176 and piston rods 198, 200 are pivotally connected to shoes 180, 182, respectively. Cylinders 202, 204 are pivotally mounted on brackets 178, 179 and piston rods 206, 208 are pivotally connected to shoes 186, 190, respectively.

Figures 5, 6:
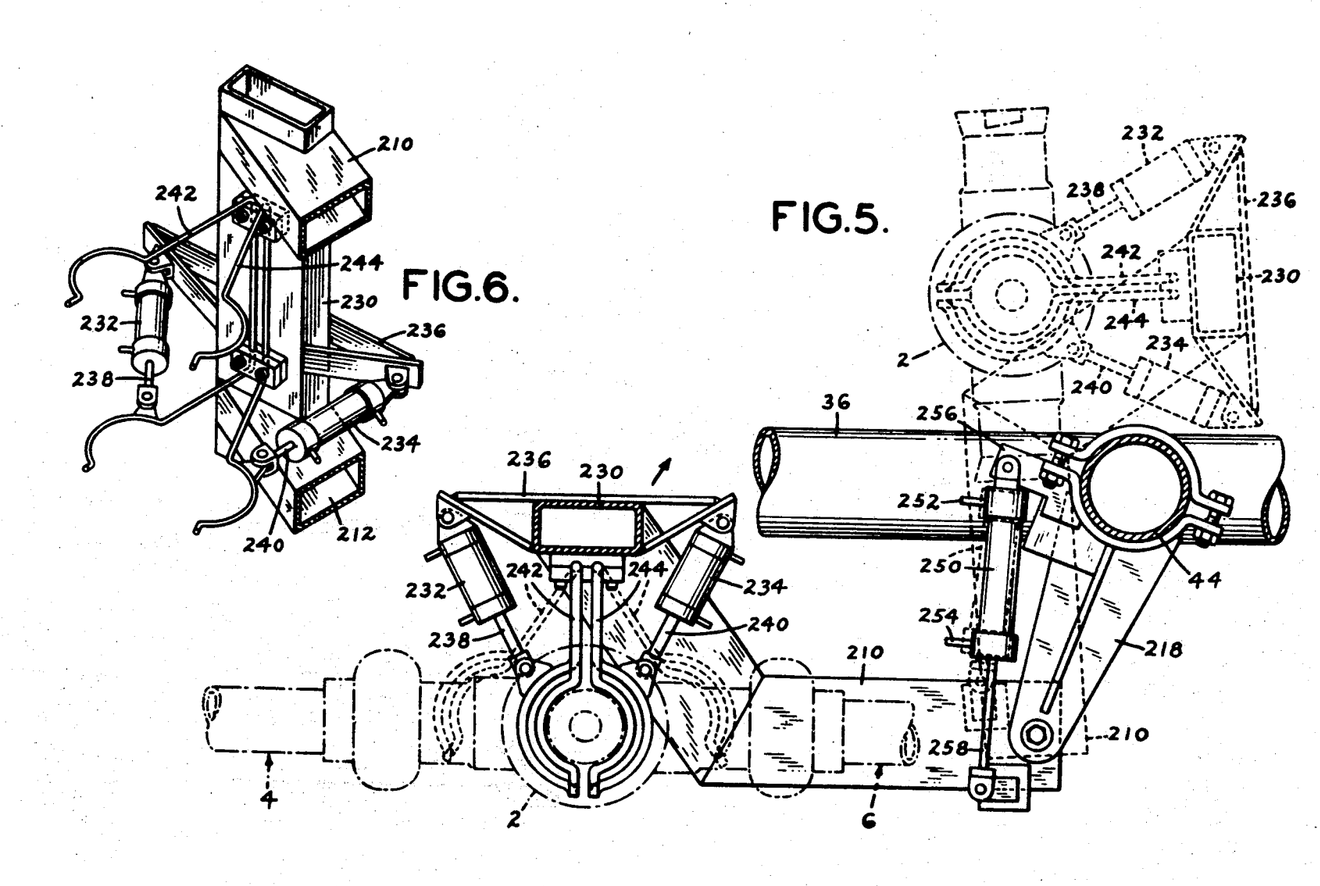
FIG. 5 is an enlarged fragmentary plan view, partly in section, showing in solid line the old valve in position and clamped by the clamping means of the instant apparatus and, in phantom line, the old valve and clamping means swung out of position.
FIG. 6 is a perspective view of the old valve clamping means of FIG. 5.

Upper and lower old valve holding arms 210, 212 are pivotally mounted, respectively, at 214, 216 to brackets 218, 220 of collars 222, 224 clamped and locked in fixed position on vertical member 44 of frame 32. At their outer, or free end, frames 210, 212 are interconnected by vertical member 230 (FIGS 2, 5 and 6). Cylinders 232, 234 are pivotally connected, at their ends, to bracket 236 fixed to vertical member 230. Piston rods 238, 240 of cylinders 232, 234, respectively, are pivotally connected to old valve clamping arms 242, 244 mounted for pivot movement on vertical member 230 and shaped at their outer free ends to engage the valve body for reasons more apparent hereinafter. Cylinder 250 having hydraulic connections 252, 254 is pivoted at one of its ends to bracket 256, mounted in fixed position on vertical member 44 and piston rod 258 is pivotally connected to arm 210. For reasons more fully described hereinafter, cylinder 250 and piston rod 258 swing valve holding arms 210, 212 on pivots 214, 216.

Figure 7:
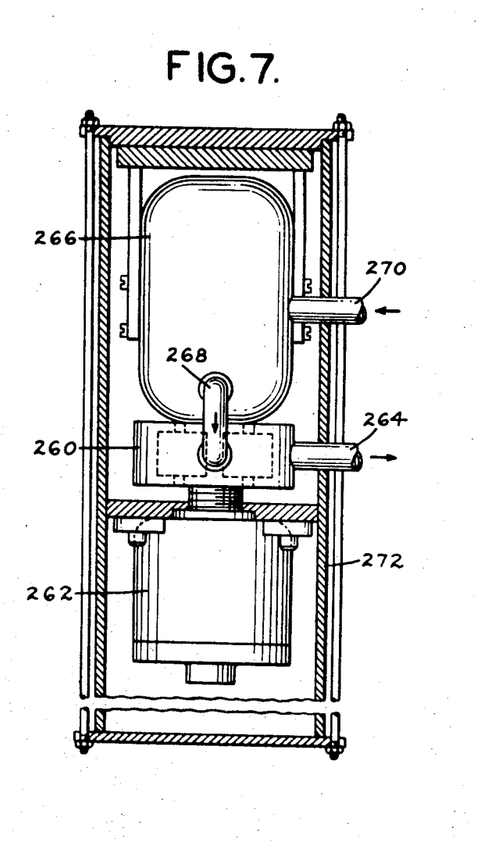
FIG 7 is a front elevational view, partly in section, of the reservoir and pump of FIGS. 1A and 1B.

Referring to FIGS. 1B and 7, hydraulic fluid, under pressure for actuating the various hydraulic cylinders on jig frame 32 and the arms and clamps mounted thereon, is furnished, through fluid pressure line 264, from pump 260, driven by electrical motor 262. Reservoir 266, through line 268, furnished hydraulic fluid to pump 260 and hydraulic fluid from the various cylinders is returned to reservoir 266 through hydraulic line 270. Pump 260, motor 262, reservoir 266 and line 268 are mounted in housing 272 on frame 32, FIG. 1B.

Figure 8:
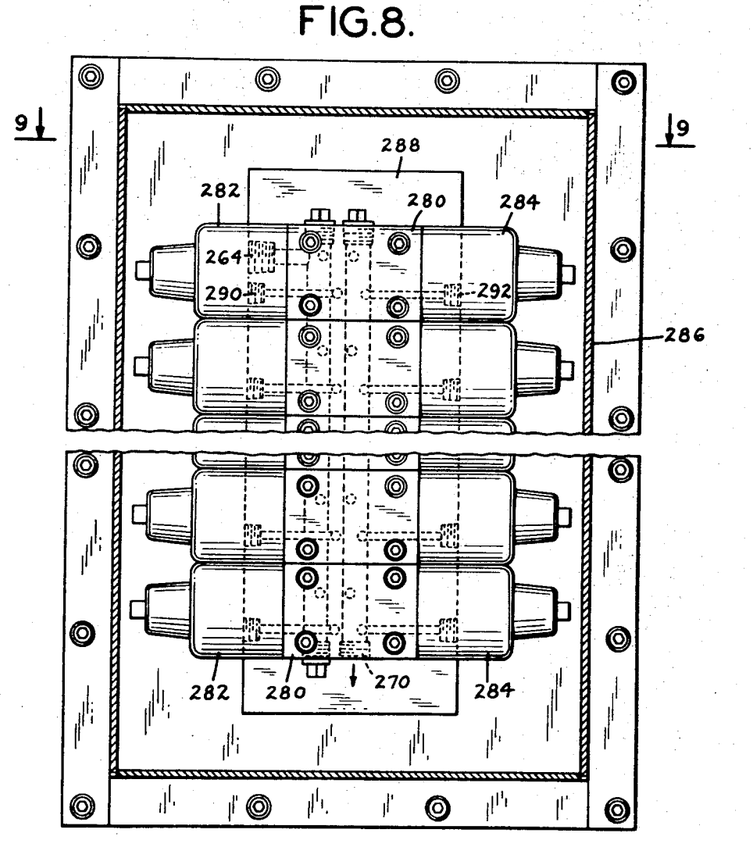
FIG. 8 is a front elevational view, partly in section, of the solenoids and solenoid operated valves for operating the instant apparatus.
Figure 9:
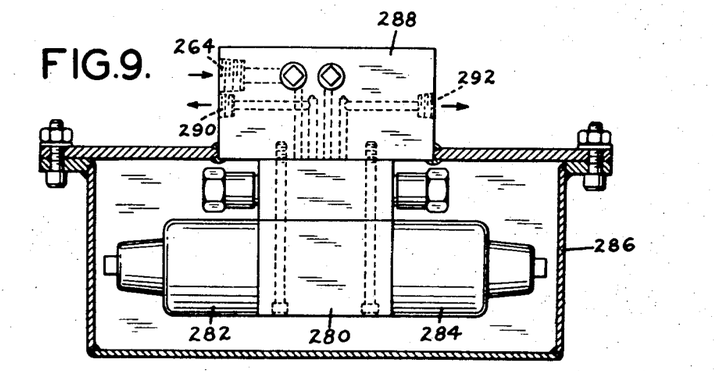
FIG. 9 is a view, taken in section at 9—9, FIG. 8.
Figure 14:
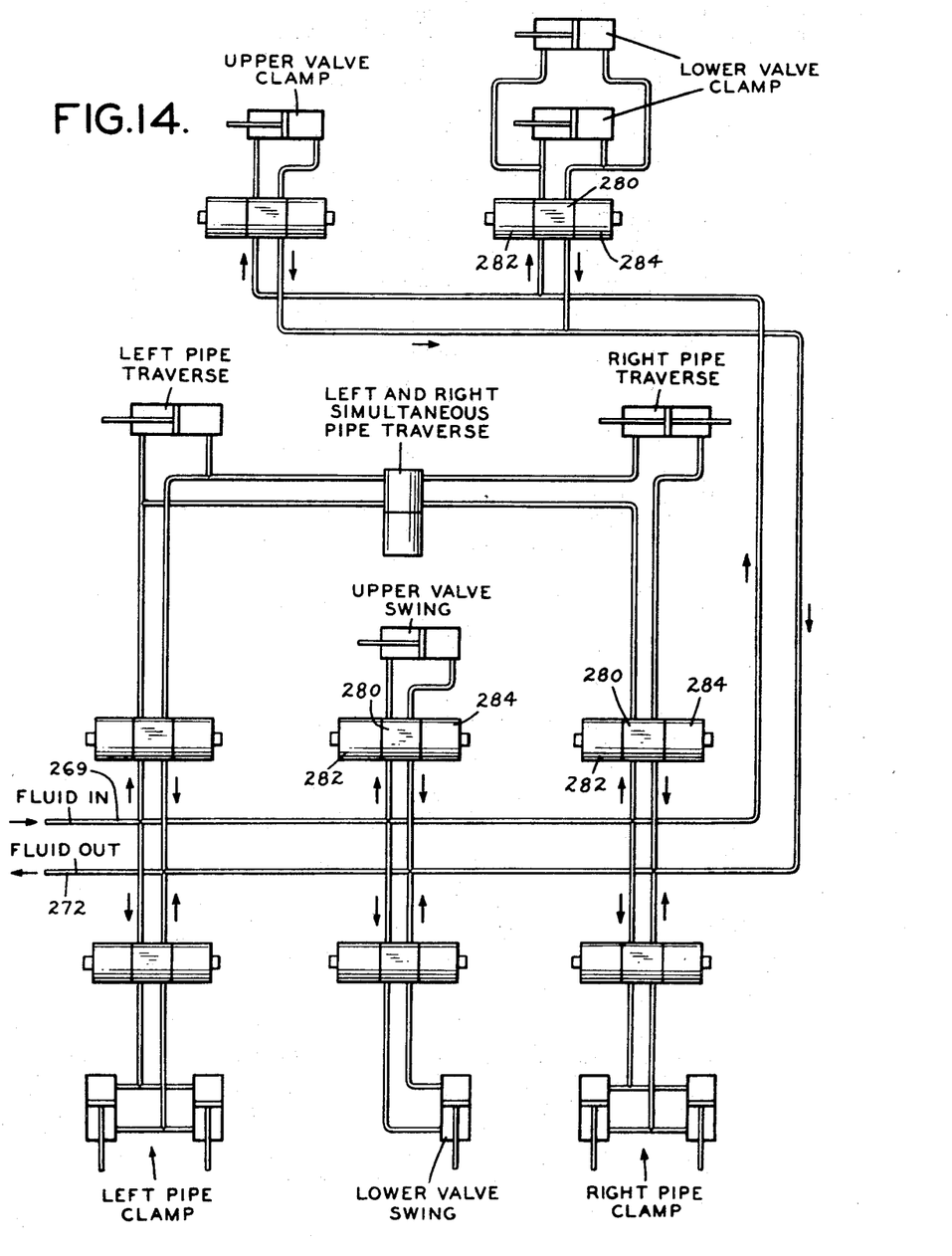
FIG. 14 is a flow diagram of the hydraulic control, cylinder and valve circuitry of the instant apparatus.

As best shown in FIGS. 1A, 8 and 9 and the flow diagram of FIG. 14, flow of hydraulic fluid, under pressure, from pressure line 264 and pump 260, and the return of fluid through line 270 to reservoir 266, is controlled through manifolded solenoid operated valves 280, each valve having solenoids 282, 284 for selectively positioning each valve. Valves 280, and solenoids 282, 284, are mounted in housing 286 fixed to jig frame 32, FIG. 1A. Each valve 280 receives fluid under pressure from pump 260 through pressure line 264 connected to all valves through suitable passages in manifold 288 and returns fluid to reservoir 266 through suitable passages in manifold 288 connected to all valves. Depending upon the direction in which a particular unit is to be operated, or moved, by the hydraulic cylinder connected thereto, valve 280 controlling such hydraulic cylinder is selectively operated by solenoid 282 or 284 to supply fluid, under pressure, to one side of the piston in such hydraulic cylinder through manifold port 290 or to the other side through manifold port 292. When the jig is attached to a submarine and submerged, solenoids 282, 284 and motor 262 are connected to and the solenoids are selectively actuated from, a control panel, not shown, in the submarine. When the jig is removed from the submarine such as, for example, when undergoing alignment, as later described, solenoids 282, 284 and motor 262 may be connected to and selectively operated from a temporary control panel.

Referring to FIGS. 1B, 3, 4 and 10, in the illustrated embodiment, remote control arm, generally designated 300, is mounted on submarine 52 by plate 302. Plate 304 is mounted on plate 302 and is pivoted thereon by cylinder 306, pivotally mounted on arm extension 308 of plate 302 and piston rod 310 pivotally connected, at 312, to plate 304. Cylinder 306 is provided with fluid pressure connections 314, 316.

Figure 10:
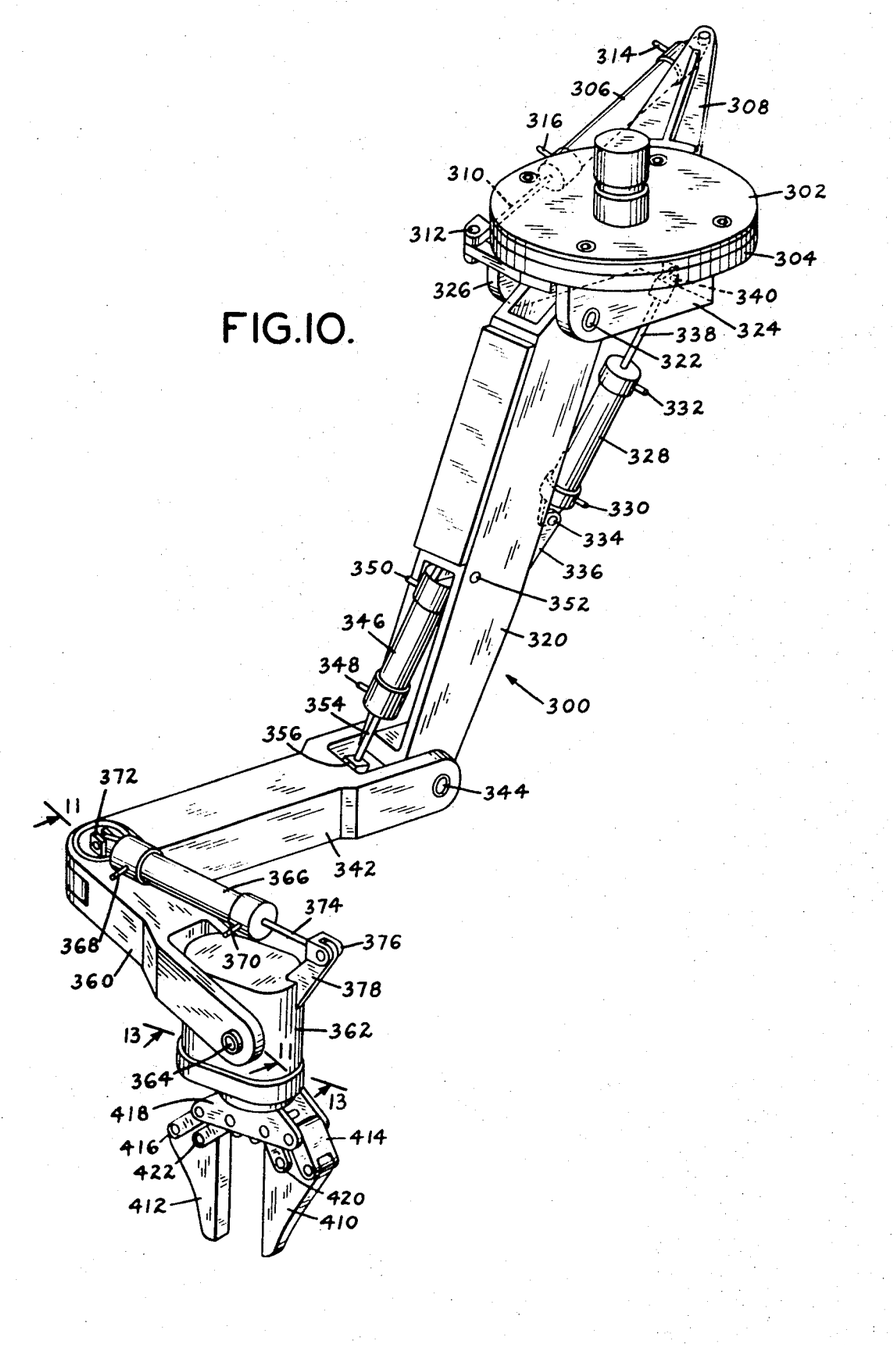
FIG. 10 is a perspective view of the remote controlled operating arm of FIGS. 1A and 1B.

Upper arm 320 is pivotally connected at 322 to brackets 324, 326, fixed, as by welding, to plate 304. Cylinder 328, having pressure connections 330, 332, is pivotally connected at 334 to bracket 336, fixed, as by welding, to upper arm 320 and piston rod 338 is pivotally connected, at 340, to plate 304. Cylinder 328 and piston rod 338 pivot upper arm 320 about pivot 322.

Intermediate arm 342 is pivotally connected, at 344, to the lower end of upper arm 320. Cylinder 346, having pressure connections 348, 350, is pivotally connected, at 352, to upper arm 320 and piston rod 354 is pivotally connected, at 356, to intermediate arm 342. Cylinder 346 and piston 354 pivot intermediate arm 342 about pivot 344. Lower arm 360 is pivotally mounted at the lower end of intermediate arm 342, in a manner hereinafter described. Clamp housing 362 is pivotally mounted, at 364, at the end of lower arm 360 and is pivoted thereon by cylinder 366, having pressure connections 368, 370, pivotally mounted at 372 to arm 360 and piston 374 pivotally connected, at 376 to bracket 378 fixed, as by welding, to housing 362.

Figures 11, 12:
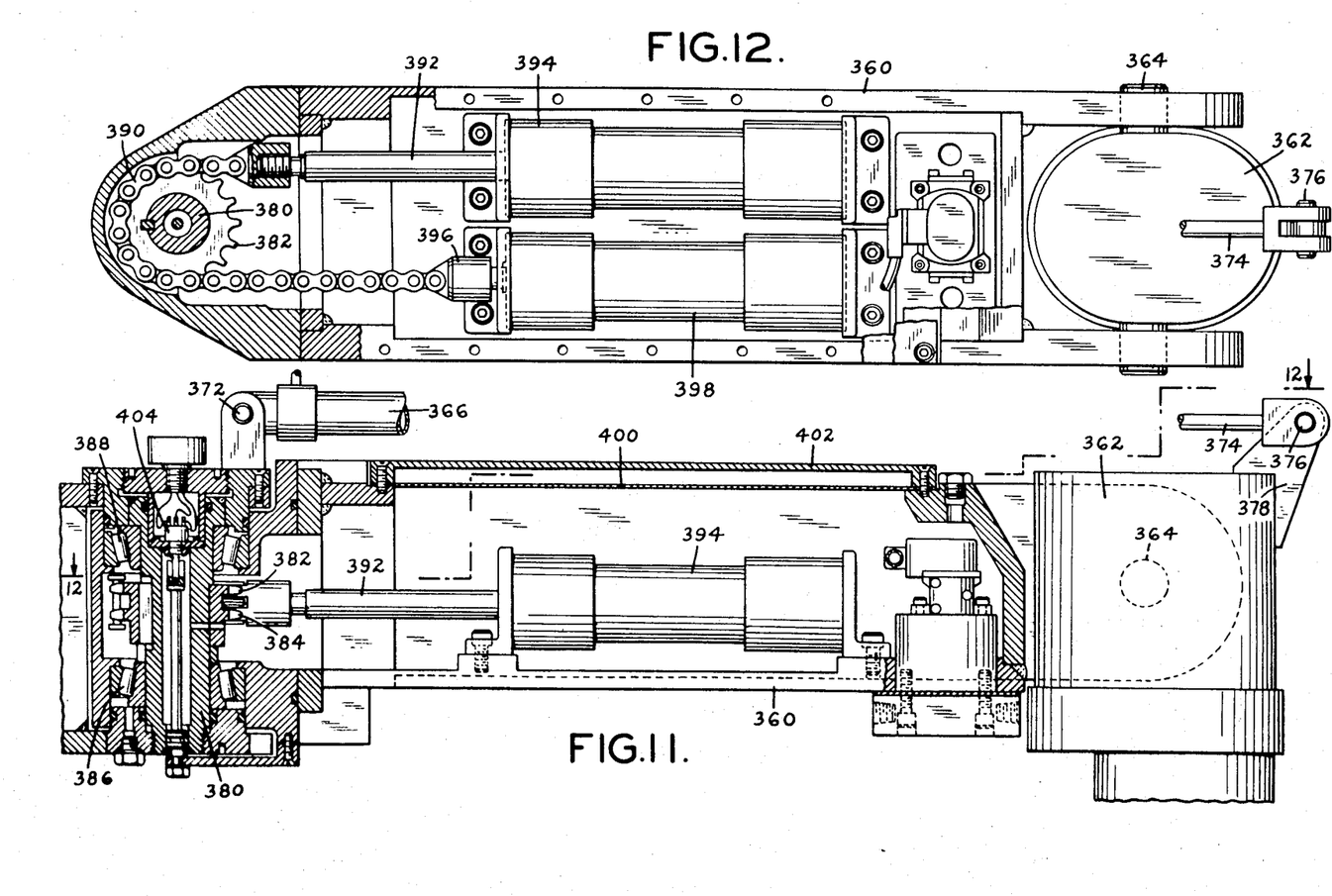
FIG. 11 is an enlarged sectional view taken at 11—11, FIG. 10.
FIG. 12 is a view similar to FIG 11 but taken at 12—12, FIG. 11.

Referring to FIGS. 11 and 12, spindle 380 is fixed to arm 360 and sprockets 382, 384 are keyed to spindle 380. Spindle 380 is mounted in bearings 386, 388 at the end of intermediate arm 342. Chain 390 is connected at one end to piston rod 392 of cylinder 394 and, at its other end, to piston rod 396 of cylinder 398. Cylinders 394, 398 are fixed in lower arm 360, access to the cylinders being provided through covers 400, 402 removably on arm 360. The housing of variable potentiometer 404 is mounted, in fixed position, on intermediate arm 342 and the slide of variable potentiometer 404 is connected to spindle 380 to rotate therewith for reasons more apparent hereinafter.

Figure 13:
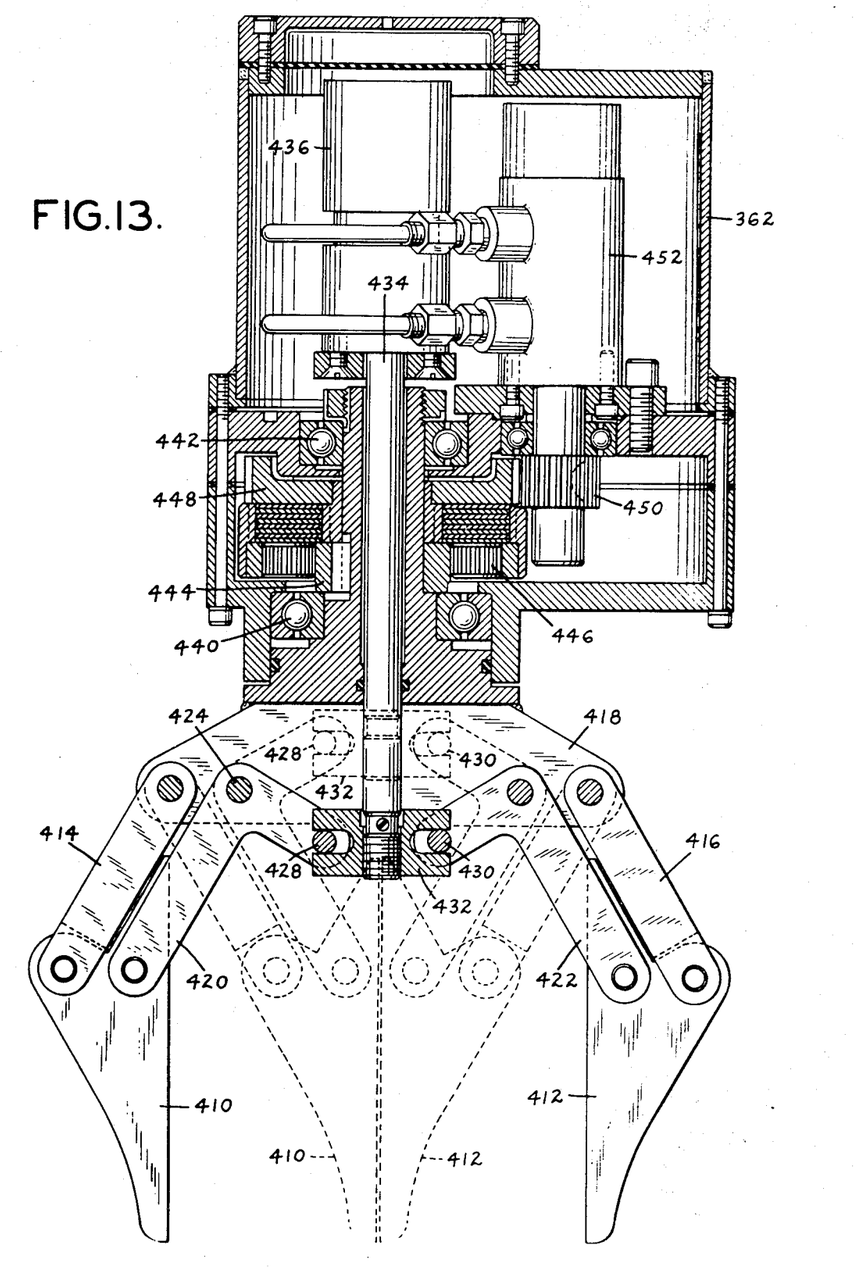
FIG. 13 is an enlarged sectional view taken at 13—13, FIG. 10.

Referring next to FIG. 13, clamp plates 410, 412 are pivoted to the ends of the links 414, 416 pivoted at their other ends to bracket 418. Plates 410, 412 are also pivoted to the ends of actuator links 420, 422 pivoted intermediate their ends, at 424, 426, to bracket 418 and connected at their opposite ends by pins 428, 430 to yoke 432 at the end of piston rod 434. Piston rod 434 is advanced outwardly of, and retracted inwardly into, housing 362 by cylinder 436, piston rod 434 when advanced outwardly spreading plates 410, 412 and, when retracted, moving plates 410, 412 toward each other and, finally, into engagement. The opposing faces of plates 410, 412 remain parallel to each other during actuation by piston rod 434 and cylinder 436. Bracket 418 and plates 410, 412 are rotatable on housing 362 and about piston rod 434 and are mounted for rotation in bearings 440, 442. Gear 444 mating with gears 446, gear 448 and gear 450, driven by hydraulic motor 452, rotate bracket 418 and plates 410, 412.

Figure 15:
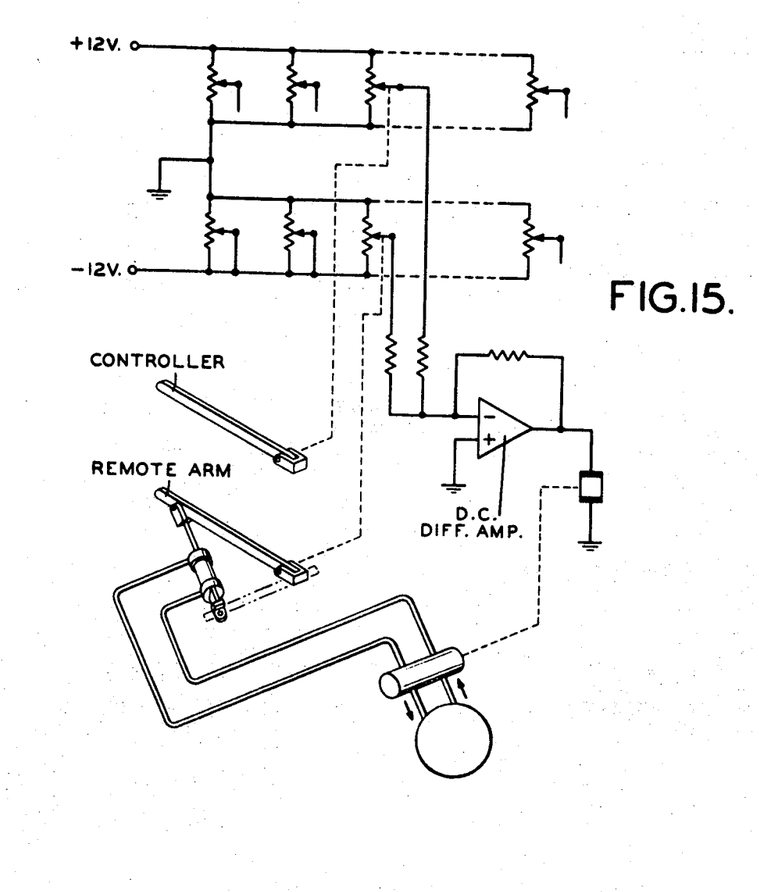
FIG. 15 is a schematic diagram of the electrical and hydraulic control circuitry of the operator and remote control arm affixed to the submarine used with the instant apparatus.

As best shown, schematically, in FIG. 15, remote arm 300 is controlled from inside of the submarine by a controller, potentiometers and D.C. differential amplifier, connected, in circuit, with potentiometers, servo valves, and a hydraulic system on remote control arm 300. Each of the pivots, interconnecting the various arm members with each other, includes variable potentiometer similar to potentiometer 404 and connected to the respective members as hereinbefore described with respect to variable potentiometer 404 on intermediate arm 342 and lower arm 360. Pivotal movement of one arm member relative to the other arm member of remote control arm 300 results in a movement, or an adjustment, of the variable potentiometer. Each such variable potentiometer on remote control arm 300 is matched with a similar variable potentiometer, in the submarine, connected to the controller. Thus, as the controller in the submarine is moved by the operator, resulting in a movement in the control variable potentiometer in the submarine, the D.C. differential amplifier is unbalanced, causing the servo valve connected to the output thereto to be activated proportionally to the sign and magnitude of the unbalance of the amplifier. The output ports of the servo valve are connected to the ports of the cylinder or actuator in the arm which would produce a motion in the arm corresponding to that made by the operator in the controller. The hydraulic connections are made such that when oil flows through the servo valve, it moves the cylinder or actuator in the proper direction to drive the wiper of the associated variable potentiometer in the proper direction to bring its output towards rebalance of the D.C. differential amplifier, and hence closing the servo valve. In this manner, movement of the controller, by the operator in the submarine, results in a corresponding movement in the remote control arm outside of the submarine. The operator, in the submarine, can thereby move arm 300, engage plates 410, 412 and manipulate the arm to perform various operations outside of the submarine hereinafter described as such operations may be required.

In the operation of the illustrated embodiment for changing a valve in an underwater pipe line, the jig is aligned on the surface, either separated from or attached to the submarine, before the jig is submerged.

This can be accomplished with a mock-up of the pipe line with the type of valve to be changed. Any changes in the jig, such as, changes of clamping shoes 180, 182, 186, 190 to accommodate larger or smaller pipes, clamping arms 242, 244 to accommodate a larger or smaller valve, or similar changes or adjustments can be made. The valve, to replace the submerged valve to be changed, is positioned in clamp 102 and movable element 106 is closed, locking the new valve in position in clamp 102. New valve holding arm 84 is raised to the position shown in FIG. 1A. The new, or replacement, valve should be locked and arm 84 should be raised so that, when the jig is submerged, the old valve is removed and arm 84 is lowered, the new valve, locked in clamp 102, will be in proper position, when arm 84 is lowered, and can be connected as the valve replacement in the pipeline without extensive manipulation.

With the new valve properly positioned and locked in arm 84 and elevated to the position shown in FIG. 1A, upper and lower valve holding arms 210, 212 and vertical member 230 retracted and clamping shoes 180, 182, 186, 190 open, the jig is attached to the front of submarine 52 and the submarine submerges. With the aid of lights, 80, 82, observations by the operator in the submarine through the submarine ports and a television camera 74, the submarine and jig is maneuvered to the pipeline, preferable, so that the pipeline can be engaged, at the opposite sides of the valve to be replaced, by clamping shoes 180, 182 and 186, 190. If the pipeline, but not the valve to be replaced, is located, the jig can be clamped onto the pipeline with clamping shoes 180, 182, 186, 190 and the jig and submarine can be moved longitudinally along the pipeline by actuating movable plates 142, 144 longitudinally of fixed plates 130, 132 and by alternately releasing and engaging clamping shoes 180, 182 and 186, 190, until the valve is located. When the valve to be replaced is located, clamping shoes 180, 182, 186, 190 can be released by actuating cylinders 194, 196, 202, 204, releasing the jig and submarine from the pipeline. The submarine can then be maneuvered and repositioned to engage the pipeline at the opposite sides of the valve to be replaced, valve 2, and clamping shoes 180, 182 and 186, 190 can be engaged with pipes 4, 6.

With clamping shoes 180, 182 and 186, 190 in engagement with pipes 4, 6, the jig and submarine 52 are aligned with valve 2. In the illustrated embodiment, such alignment is accomplished by actuating valve 280, connected to piston 250, with its solenoid 284, to swing arms 210, 212 outwardly with old valve clamping arms 242, 244 open and by actuating cylinders 154, 168, through the appropriate valves 280 and solenoids 284. Thus, movable plates 142, 144 are clamped to pipes 4, 6 of the pipeline, by clamping shoes 180, 182, 186, 190, and the jig and submarine are moved longitudinally, along the pipeline until arms 210, 212, vertical member 230 and old valve clamping arms 242, 244 are in alignment with valve 2 to be replaced. In so moving the submarine and jig longitudinally along the pipeline, clamping shoes 180, 182, 186, 190, may be alternately released, repositioned and clamped to the pipe, if the amount of longitudinal movement required exceeds the travel of movable plates 142, 144 in fixed plates 130, 132.

With submarine 52 and the jig aligned with valve 2, to be replaced, arms 210, 212, with vertical arm 230 and clamping arms 242, 244, which are open, are retracted with the cylinder 250 and piston rod 258. Bolts in locking lugs 20, 24, and 22, 26 are removed by the operator in the submarine manipulating remote control arm 300 and plates 410, 412 with the controller, FIG. 15, in submarine 52. Preferably, such bolts are removed with a power wrench gripped between plates 410, 412. The power wrench, not shown, may be carried in a bracket on the jig or on the submarine 52 and is taken out, used and returned to the bracket by manipulation of remote control arm 300 by the operator in the submarine.

With the bolts removed, coupler 12 is rotated by manipulating remote control arm 300 from the submarine and gripping and rotating coupler 12 with plates 410, 412 to align recesses 14, on coupler 12, with lug 16 on valve 2. Coupler 12 is then pulled back along pipe 6 away from valve 2. The operator in the submarine then swings arms 210, 212 and vertical member 230 toward valve 2 to engage the old valve and actuates cylinders 232, 234 and piston rods 238, 240 to engage arms 242, 244 with valve 2. Next, the operator in the submarine, by manipulating remote control arm 300 and plates 410, 412, rotates and removes coupler 10.

When couplers 10 and 12 have both been removed with valve 2 engaged and held by clamping arms 242, 244, pipes 4, 6, clamped in clamping shoes 180, 182 and 186, 190, respectively, are spread, longitudinally, away from valve 2 by actuating cylinders 154, 168 until the ends of pipes 4, 6 are clear of valve 2. Cylinder 250 and piston rod 258 are actuated to swing arms 210, 212 away from pipes 4, 6 and to swing the old valve, held by clamping arms 242, 244, out of the pipeline. Arm 84, with the new valve, is then lowered into position between the spread ends of pipes 4, 6, by actuating cylinders 96, 97. The new valve is aligned with the pipe ends, and the pipe ends are advanced into the new valve by actuating cylinders 154, 168. The submarine operator, by manipulating remote control arm 300 and plates 410, 412, with the controller in the submarine, connects pipes 4, 6 with the new valve by reinstalling and rotating couplers 10, 12 and reinstalling the bolts in locking lugs 20, 24 and 22, 26. This may be accomplished before the operator actuates cylinder 110 and piston rod 116 to release the new valve from movable element 106 and fixed element 104 and rotates arm 84 upwardly into its original position or the new valve may be partially installed, by, for example, connecting one side of the valve to the pipeline with the coupler, releasing the new valve and rotating the arm 84 and then completing the coupling and locking of the replacement valve to the line. In any event, before the new valve is released from clamp 102, sufficient connection to the pipeline should be made to maintain the valve in its intended position in the pipeline.

After the new valve has been installed, coupled and locked into the pipeline, clamp 102 has been released and arm 84 has been retracted and elevated, clamping shoes 180, 182 and 186, 190 are released from pipes 4, 6 by actuating the appropriate valves and solenoids from the control panel in the submarine and the submarine, with the jig attached, then returns to the surface. With the submarine at the surface, the old valve can be removed from the jig.

In addition to changing valves, the jig of the instant invention may be readily adapted, by one skilled in the art, to other under water servicing and replacement operations. For example, the jig of the instant invention can be readily adapted to the inspection and repairs of under water pipelines and, for such purposes, is movable, longitudinally along the pipeline. Where, for example, there is underwater growth, corrosion, or the like, on a valve which is to be replaced, and such growth or corrosion, would interfere with the decoupling of the old valve, the apparatus of the instant invention might include, along with a power wrench, a power brush for cleaning the coupling and pipes before decoupling. Such a power brush could be mounted on a suitable bracket on the jig or submarine and could be removed from the bracket, used and replaced on the bracket by remote control arm 300 in the same manner as the power wrench heretofore described.

The jig may also be adapted for servicing or replacing components in under water installation where the components are not associated with a pipeline but, rather, with other structure. For example, if the component to be serviced or replaced is associated with an under water rig or platform, pipe clamping shoes 180, 182 and 186, 190 may be replaced with shoes of a configuration adapted to be engaged with, and clamped onto, a structured member of the underwater rig or platform.

In addition to under water installation, the jig of the instant invention may be readily adapted, by one skilled in the art, to servicing and replacement operations in weightless medium other than water. Depending upon the characteristics of the medium, the jig of the instant invention may be attached to a vehicle other than a submarine.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. A jig for servicing and replacing components in an installation, said jig having a frame, means on said frame for engaging a member on said installation adjacent to a component to be serviced, means on said engaging means for moving said frame relative to said member engaged by said engaging means and for aligning said frame with said component to be serviced, means on said frame for engaging said component to be serviced and for removing said component from said installation and means on said frame for engaging a replacement component for said component to be serviced and for positioning said replacement component in said installation after said component to be serviced has been removed.

2. A jig as recited in claim 1 in which said means on said frame for engaging a member on said installation includes a first clamping means and a second clamping means, means for selectively engaging said first and second clamping means with said member on said installation and means on said first and second clamping means for selectively moving said clamping means relative to said frame for aligning said frame with said component to be serviced.

3. A jig as recited in claim 2 in which said means on said frame for engaging said component to be replaced includes an arm mounted for pivotal movement on said frame, clamping means on said arm, means for moving said clamping means on said arm in a first direction to clamp a component to be replaced therebetween and in a second direction to release said component to be replaced and means for moving said arm in a first direction on said frame to engage said component to be replaced and in a second direction to remove said component.

4. A jig as recited in claim 3 in which said means on said frame for engaging a replacement component includes an arm mounted for pivotal movement on said frame, clamping means on said arm for engaging said replacement component, means for engaging said clamping means with said replacement component and for releasing said clamping means from said replacement component, and means for moving said replacement component arm in a first direction on said frame for positioning said replacement component in said installation and in a second direction for retracting said replacement component arm.

5. A jig as recited in claim 4 in which said frame includes means for attaching said frame to a submarine.

6. A jig for servicing and replacing components in an under water installation, said jig including a frame and a submarine, means on said frame for attaching said frame to said submarine, means on said frame for engaging a member on said under water installation, means on said engaging means for moving said frame and said submarine relative to said member engaged by said engaging means and for aligning said frame and said submarine with said component to be serviced, means on said frame for engaging said component to be serviced and for removing said component from said under water installation, means on said submarine for disconnecting said component to be serviced from said under water installation and for connecting a replacement component to said installation, means on said frame for engaging and replacement component for said component to be serviced and for positioning said replacement component in said under water installation after said component to be serviced has been removed, and means for releasing and retracting said replacement component engaging means after said replacement component is connected to said installation with said means on said submarine.

7. A jig as recited in claim 6 in which said means on said frame for engaging a member on said under water installation includes a first clamping means and a second clamping means, means for selectively engaging said first and second clamping means with said member on said under water installation and means on said first and second clamping means for selectively moving said clamping means relative to said frame for aligning said frame with said component to be serviced.

8. A jig as recited in claim 7 in which said means on said frame for engaging said component to be serviced includes an arm mounted for pivotal movement on said frame, clamping means on said arm, means for moving said clamping means on said arm in a first direction to clamp a component to be replaced therebetween and in a second direction to release said component to be replaced and means for moving said arm in a first direction on said frame to engage said component to be replaced and in a second direction to remove said component.

9. A jig as recited in claim 8 in which said means on said frame for engaging a replacement component includes an arm mounted for pivotal movement on said frame, clamping means on said arm for engaging said replacement component, means for engaging said clamping means with said replacement component and releasing said clamping means from said replacement component, and means for moving said replacement component arm in a first direction on said frame for positioning said replacement component in said under water installation and in a second direction for retracting said replacement component arm.

10. A jig as recited in claim 9 in which said disconnecting and connecting means on said submarine includes a remote controlled arm attached at one of its ends to said submarine and at its other end having clamping means, said remote controlled arm, intermediate its ends, having a plurality of members pivotally connected, one to the other, and means on said members, where said members are pivotally connected, responsive to means in said submarine for moving said remote controlled arm in response to movement of said means in said submarine.

11. A jig for replacing valves in an under water pipeline, said jig including a frame and a submarine, means on said frame for attaching said frame to said submarine, means on said frame for engaging the pipe of said pipeline and for moving said frame and said submarine longitudinally along said pipeline and for aligning said frame and said submarine with a valve to be replaced in said pipeline, means on said frame for engaging said valve to be replaced and for removing said valve from said pipeline, means on said submarine for disconnecting said valve to be replaced from said pipeline and for connecting a replacement valve to said pipeline, means on said frame for engaging a replacement valve for said valve to be replaced and for positioning said replacement valve in said under water pipeline after said valve to be replaced has been removed and means for releasing and retracting said replacement valve engaging means after said replacement valve is connected to said pipeline with said means on said submarine.

12. A jig for positioning a work performing member relative to an installation in a medium in which said member is essentially weightless and on which installation said work performing member is to perform work, said jig having a frame, means on said frame for attaching said work performing member to said frame, at least two releasable elements attached to said frame, means for moving said releasable elements relative to each other and to said work performing member attached to said frame, means on said releasable elements for engaging portions of said installations for attaching said jig and said work performing member to said installation and for sequentially releasing each of said releasable elements from the portion of said installation engaged, means for moving said work performing member when each of said releasable elements is so released relative to the other of said releasable elements for adjusting the position of said member relative to said installation and means on at least one of said releasable elements for firmly engaging said one of said releasable elements with its corresponding engaging portion of said installation for attaching said jig and said work performing member to said installation for transmitting from said member to said installation reaction forces resulting from work performed by said work performing member on said installation.

* * * * *